(12) United States Patent
Hoffman et al.

(10) Patent No.: US 11,716,047 B2
(45) Date of Patent: Aug. 1, 2023

(54) SYSTEM AND METHOD FOR TRAJECTORY SHAPING FOR FEASIBLE MOTION COMMANDS

(71) Applicant: Rockwell Automation Technologies, Inc., Mayfield Heights, OH (US)

(72) Inventors: Jonathan D. Hoffman, Milwaukee, WI (US); Brian Fast, Kirtland, OH (US); Robert J. Miklosovic, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 46 days.

(21) Appl. No.: 17/352,792

(22) Filed: Jun. 21, 2021

(65) Prior Publication Data
US 2022/0407447 A1    Dec. 22, 2022

(51) Int. Cl.
H02P 29/024   (2016.01)
H02P 29/40    (2016.01)
H02P 29/10    (2016.01)

(52) U.S. Cl.
CPC ............ *H02P 29/024* (2013.01); *H02P 29/10* (2016.02); *H02P 29/40* (2016.02)

(58) Field of Classification Search
CPC ......... H02P 29/024; H02P 29/10; H02P 29/40
See application file for complete search history.

(56) References Cited

U.S. PATENT DOCUMENTS

2018/0262144 A1    9/2018  Miklosovic et al.
2018/0292255 A1*  10/2018  Miklosovic ......... G01M 13/045

FOREIGN PATENT DOCUMENTS

EP    2031363 A1    3/2009
GB    2270998 A     3/1994

OTHER PUBLICATIONS

Extended European Search Report dated Nov. 17, 2022; Application No. 22180207.7—(6) pages.

* cited by examiner

Primary Examiner — Muhammad S Islam
Assistant Examiner — Bradley R Brown
(74) Attorney, Agent, or Firm — Boyle Fredrickson, SC

(57) ABSTRACT

A system and method for shaping the trajectory of a motion command to reduce the effects of a load on performance of a motor dynamically modifies the motion profile in real time to limit the reference signals in the motion profile to feasible commands. A load observer determines an estimated disturbance acceleration. The estimated disturbance acceleration includes the dynamics of the controlled load and is used to modify a maximum and a minimum limit for the acceleration reference. The acceleration limits are, in turn, used to determine velocity limits. The motion profile and modified acceleration and velocity limits are provided to a state filter which determines a new motion profile for use by the motor drive to control operation of a motor and to control the load connected to the motor.

20 Claims, 13 Drawing Sheets

SYSTEM AND METHOD FOR TRAJECTORY SHAPING FOR FEASIBLE MOTION COMMANDS

BACKGROUND INFORMATION

The subject matter disclosed herein relates to a system and method of providing a feasible command trajectory for a motion system, and more specifically, to a system and method for estimating performance of a load connected to the motor to adaptively adjust velocity and acceleration limits for the motor controlling operation of the load.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The rectifier section may be a passive rectifier with diodes converting the AC voltage to a DC voltage, or the rectifier section may be an active front end with power electronic switching devices, such as insulated gate bipolar transistors (IGBTs), thyristors, or silicon-controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to convert the AC voltage to a desired DC voltage on the DC. An inverter section is supplied between the DC bus and an output of the motor drive to convert the DC voltage on the DC bus back to an AC voltage having a variable amplitude and frequency to control rotation of the motor. The inverter section includes power electronic switching devices and receives switching signals to selectively turn on and off each switching device to obtain the desired AC voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude and/or frequency of the output voltage is varied. The motor controller utilizes modulation techniques such as pulse width modulation (PWM) to control the switching and to synthesize waveforms having desired amplitudes and frequencies.

In certain applications, the command signal for the motor drive may be generated by an industrial controller, such as a programmable logic controller (PLC) or a programmable automation controller (PAC). The industrial controller is configured to execute a control program to control operation of an industrial machine or process. Further, the industrial machine or process may include multiple motors and multiple motor drives to control the motors. The industrial controller receives feedback signals from sensors on the controlled machine or process corresponding to the present operating state and generates output signals with the control program to actuators and to the motor drives as a function of the feedback signals to achieve a desired operation of the controlled machine or process.

Although the industrial controller generates a command signal corresponding to desired operation of the controlled machine or process, it may not always be possible for the motor drive to control operation of the motor to achieve the desired operation. For instance, the industrial controller may generate a step command for the motor to change velocity from a first speed to a second speed instantaneously. The motor cannot instantly change speed and the drive will accelerate as a function of a number of tuning parameters up to the second speed. In a first configuration, the response of the motor drive may be tuned for a slow response. This first configuration may allow the motor to accelerate up to the desired speed without any overshoot but require an extended period of time to complete the acceleration. However, such performance reduces productivity and underutilizes the performance capacity of the motor drive. Alternately, the motor drive may be tuned for a rapid response. This second configuration may cause the motor to rapidly reach the desired speed, but may also cause some overshoot, meaning the motor initially accelerates beyond the second speed and must be controlled back down to the second speed. If the motor drive is tuned for a very rapid response, the overshoot could result in multiple oscillations back and forth around the second speed before finally settling on the second speed.

In order to avoid these undesirable operating conditions, the industrial controller may have stored parameters corresponding to the capabilities of the motor drive, and the industrial controller may be configured to generate motion profiles corresponding to the capabilities of the motor drive. Rather than a step change in velocity, the industrial controller may, for example, generate a ramped change in velocity from the first speed to the second speed at a maximum available acceleration rate for the motor drive. A ramped change in velocity provides a more feasible command trajectory for a motor drive to follow than a stepped change in velocity.

However, despite having knowledge of the configuration of the motor drive, an industrial controller may not always be able to generate a feasible trajectory for the motor drive to follow. The ability of the motor drive to follow a trajectory is dependent not only on the configuration of the motor drive but also on the configuration of the load to be driven by the motor. In certain applications, a load may be coupled by a rigid connection and have a fixed inertia. Such a load may result in a predictable response and may be factored into the motion profile generated by the industrial controller. In other applications, the load may be coupled via a flexible coupling, which may introduce resonance and/or backlash into the controlled system. In still other applications, the load may vary during operation and may even vary in an unknown manner. Such variations in the dynamics of the controlled system may result in motion profiles that cannot always be followed by the motor drive. The motor drive will respond according to its maximum response limits, but there could be overshoot, oscillation, or other undesirable performance of the motor.

Thus, it would be desirable to provide a system for shaping the trajectory of a motion command to reduce the effects of the load on performance of the motor.

BRIEF DESCRIPTION

According to one embodiment of the invention, a system for shaping a motion command for a motor includes an input configured to receive a position feedback signal, a memory configured to store multiple instructions, and a processor. The position feedback signal corresponds to an angular position of the motor. The processor is in communication with the memory and is configured to execute the plurality of instructions to sample the position feedback signal and to determine an estimated value of a disturbance acceleration. An acceleration limit is dynamically modified in real-time responsive to the estimated value of the disturbance acceleration. The motion command for the motor is received from a motion controller, and a modified motion command is determined as a function of the motion command, and of the modified acceleration limit. The modified motion command is provided as an input to a control module, where the control module is configured to control the motor.

According to another embodiment of the invention, a method for shaping a motion command for a motor receives the motion command for the motor at a motor drive from a motion controller. A position feedback signal, corresponding to an angular position of the motor, is sampled with the motor drive, and an estimated value of a disturbance acceleration is determined in the motor drive. An acceleration limit is determined in real-time responsive to determining the estimated value of the disturbance acceleration. A modified motion command is determined as a function of the motion command and of the modified acceleration limit.

According to still another embodiment of the invention, a system for shaping a motion command includes a memory configured to store a plurality of instructions and a processor in communication with the memory. The processor is configured to execute the plurality of instructions to obtain an estimated value of a disturbance acceleration, where the disturbance acceleration is generated responsive to the motion command. The processor is further configured to dynamically modify an acceleration limit in real-time responsive to obtaining the estimated value of the disturbance acceleration, to receive the motion command from a motion controller, and to determine a modified motion command as a function of the motion command and of the modified acceleration limit.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
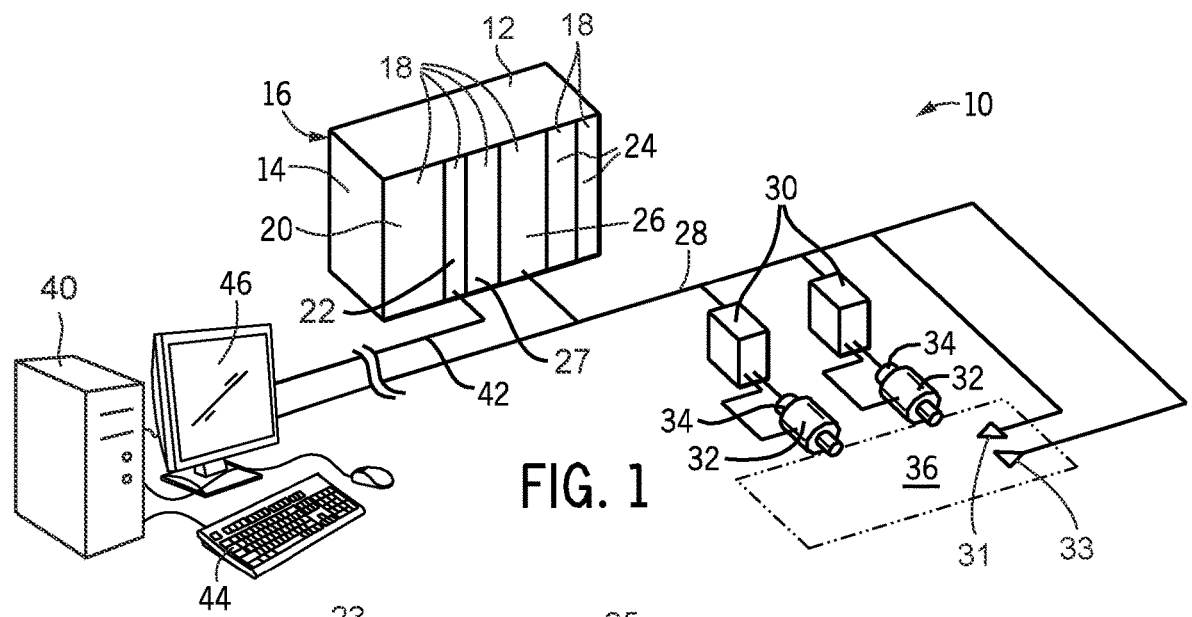
FIG. 1 is an exemplary industrial control system in which embodiments of the present invention are incorporated.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for shaping the trajectory of a motion command to reduce the effects of the load on performance of the motor. A motion controller generates motion profiles for axes to follow in the controlled system, where an axis of motion includes a motor and a motor drive to control operation of the motor. The motion controller may be a dedicated motion control module in an industrial controller or, optionally, the motion controller may be a routine executing within a processor module for the industrial controller. In still other embodiments, the motion controller may be a dedicated motion controller executing separately of the industrial controller. According to yet another embodiment, the motion controller may be configured to execute within the motor drive. In response to a control program executing on the processor module, the motion controller generates a motion profile which may include a position reference signal, a velocity reference signal, an acceleration reference signal, or a combination thereof. The motion profile is passed to a trajectory shaping module which improves the feasibility of the motion profile independently of the characteristics of a load controlled by the axis. According to one embodiment of the invention, the trajectory shaping module is executed within the industrial controller. According to another embodiment of the invention, the trajectory shaping module is executed within a motor drive configured to control the axis.

The trajectory shaping module receives the motion profile from the industrial controller and dynamically modifies the motion profile in real time to limit the reference signals in the motion profile to feasible commands. A load observer is configured to determine an estimate of disturbance acceleration experienced at the motor. The estimated disturbance acceleration includes all unknown or non-ideal dynamics of the controlled load or external disturbances experienced by the load and is used to dynamically modify the motion profile. The estimated disturbance acceleration is used to modify a maximum and a minimum limit for the acceleration reference. The acceleration limits are, in turn, used to determine a maximum and a minimum velocity limit. The motion profile, modified acceleration limits, and modified velocity limits are provided to a state filter which determines a new motion profile for use by the motor drive to control operation of a motor and to control the load connected to the motor. The state filter is configured to mirror a control module executing within the motor drive. However, the state filter limits the velocity and acceleration references determined within the state filter to the modified limits. As a result, the shaped motion profile output from the state filter is limited to a command that is more feasible for a load connected to the motor than may otherwise be configured in the motor drive.

Referring initially to FIG. 1, an industrial control system 10 may include an industrial controller 12 providing, generally, a housing 14 and a bus 16 providing communication between multiple modules 18 installed in the housing 14. The modules may include, for example, a power supply module 20, a processor module 22, one or more I/O modules 24, a motion control module 27, and a network module 26. The network module 26, processor module 22, or a combination thereof may communicate on an industrial control network 28, such as ControlNet®, DeviceNet®, or EtherNet/IP®, between the industrial controller 12 and other devices connected to the industrial controller. The industrial controller 12 may be, for example, a programmable logic controller (PLC), a programmable automation controller (PAC), or the like. It is contemplated that the industrial controller 12 may include still other modules, such as an axis control module, or additional racks connected via the industrial control network 28. Optionally, the industrial controller 12 may have a fixed configuration, for example, with a predefined number of network and I/O connections.

The industrial control network 28 may join the industrial controller 12 to remote I/O modules (not shown) and one or more remote motor drives 30, the latter of which may communicate with corresponding electric motors 32 and position sensors 34 to provide for controlled motion of the electric motors 32. The controlled motion of the electric motors, in turn, controls associated industrial machinery or processes 36. While a single motor drive and motor may be referred to as an axis of motion, an axis of motion may also require multiple motors controlled by a single motor drive or multiple motor drives and multiple motors operating in tandem. The network 28 may also join with other devices 31, 33 in the controlled machine or process 36, including, for example, actuators 31, which may be controlled by output signals from the industrial controller 12, or sensors 33, which may provide input signals to the industrial controller.

A configuration computer 40 may communicate with the industrial controller 12 and/or the motor drives 30 over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator.

Figure 2:
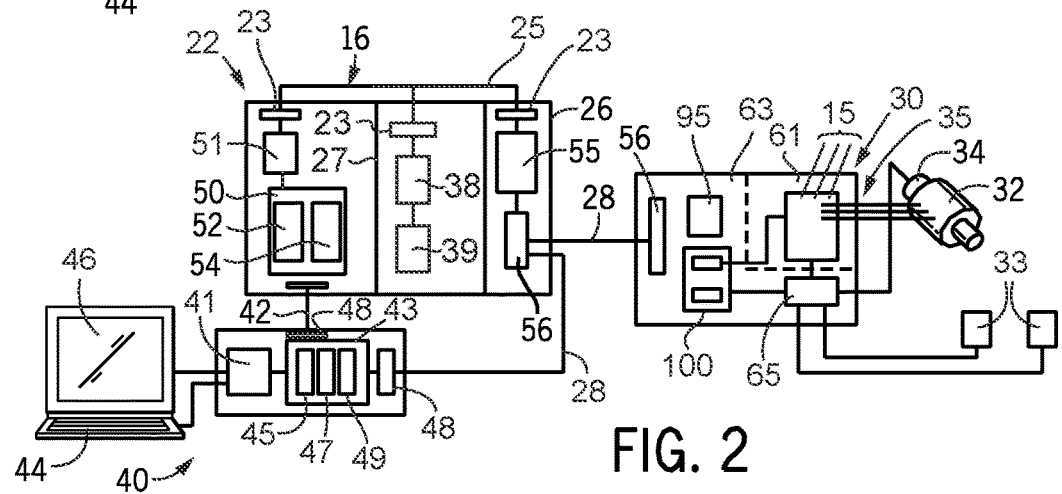
FIG. 2 is a partial block diagram representation of the exemplary industrial control system of FIG. 1

Referring next to FIG. 2, the processor module 22 includes a processor 51 communicating with a memory device 50 to execute an operating system program 52, generally controlling the operation of the processor module 22, and a control program 54, describing a desired control of the industrial machine or process 36, where each control program 54 is typically unique to a given application of the industrial control system 10. The memory 50 may also include data tables, for example, I/O tables and service routines (not shown in FIG. 2) as used by the control program 54.

The processor module 22 may communicate via the bus 16, which may be implemented as a backplane 25 extending between backplane connectors 23, with the network module 26 or any of the other modules 18 in the industrial controller 12. The network module 26 includes a control circuit 55, which may include a microprocessor and a program stored in memory and/or dedicated control circuitry such as an application specific integrated circuit (ASIC) or field programmable gate array (FPGA). The control circuit 55 may communicate with a network interface circuit 56 within the network module 26, where the network interface circuit 56 provides for execution of low-level electrical protocols on the industrial control network 28. Similar network interface circuits 56 may be provided on other devices, such as the motor drives 30, to provide communication between devices.

According to the illustrated embodiment, a motion control module 27 determines motion profiles for one or more of the motors 32 to follow. The motion profile may include a position reference signal ($\theta^*$), a velocity reference signal ($\omega^*$), an acceleration reference signal ($\alpha^*$), or a combination thereof. The motion control module 27 includes a processor 38 in communication with a memory device 39 to execute one or more motion profile generators. It is contemplated that the motion control module 27 may execute a separate motion profile generator for each axis of motion. The reference signal, or signals, are transmitted from the motion control module 27 via the backplane 25 to the network module 26 and then via the industrial control network 28 to each motor drive. In some embodiments of the invention, it is contemplated that the processor module 22 may be configured to generate the motion profile for each axis and, in turn, generate the position reference signal ($\theta^*$), the velocity reference signal ($\omega^*$), the acceleration reference signal ($\alpha^*$), or a combination thereof.

As noted above, the configuration computer 40 may be a standard desktop computer having a processor 41 communicating with a memory 43, the latter holding an operating system program 45 as well as various data structures 47 and programs 49. One such program 49 may be used to configure the industrial control system 10. The configuration computer 40 may also provide for interface circuits 48 communicating between the processor 41, for example, and the industrial network 28 or a separate communication channel 42 to the processor module 22, as well as with the screen 46 and keyboard 44 according to methods understood in the art.

Figure 3:
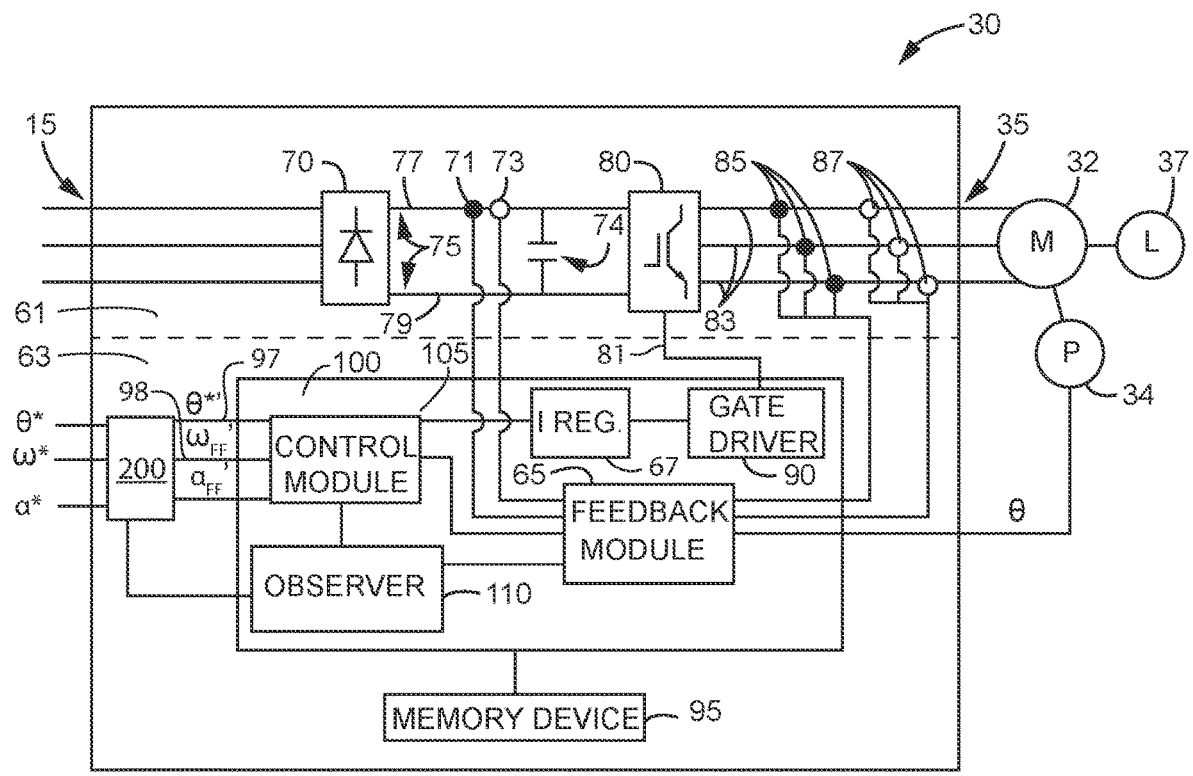
FIG. 3 is a block diagram representation of the motor drive of FIG. 1 incorporating one embodiment of the present invention.

Turning next to FIG. 3, a motor drive 30, according to one embodiment of the invention, includes a power section 61 and a control section 63. The power section 61 includes components typically handling, for example, 200-575 VAC or 200-800 VDC, and the power section 61 receives power in one form and utilizes power switching devices to regulate power output to the motor 32 in a controlled manner to achieve desired operation of the motor 32. The control section 63 includes components typically handling, for example 110 VAC or 3.3-48 VDC and, the control section 63 includes processing devices, feedback circuits, and supporting logic circuits to receive feedback signals and generate control signals within the motor drive 30.

Figure 4:
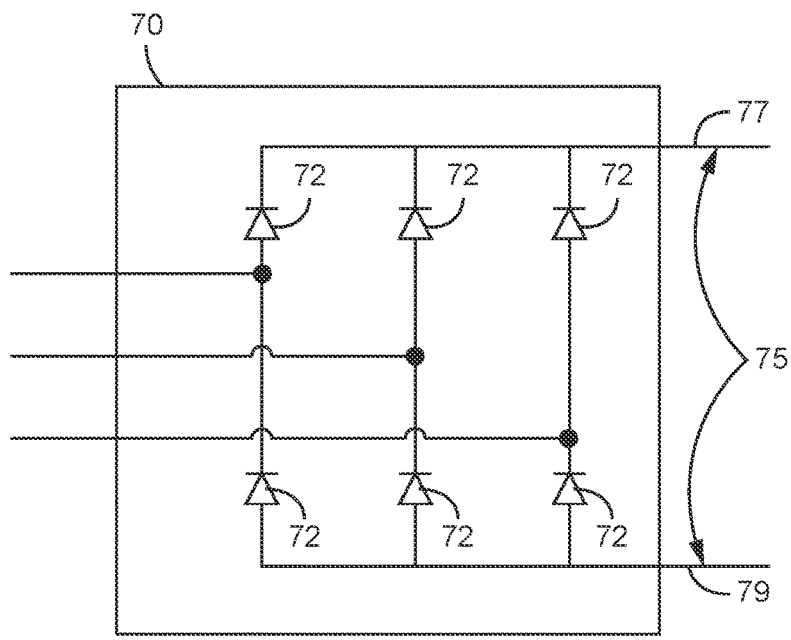
FIG. 4 is a block diagram representation of a rectifier section from the motor drive of FIG. 3.

According to the illustrated embodiment, the motor drive 30 is configured to receive a three-phase AC voltage at an input 15 of the motor drive 30 which is, in turn, provided to a rectifier section 70 of the motor drive 30. The rectifier section 70 may include any electronic device suitable for passive or active rectification as is understood in the art. With reference also to FIG. 4, the illustrated rectifier section 70 includes a set of diodes 72 forming a diode bridge that rectifies the three-phase AC voltage to a DC voltage on the DC bus 75. Optionally, the rectifier section 70 may include other solid-state devices including, but not limited to, thyristors, silicon-controlled rectifiers (SCRs), or transistors to convert the input power 15 to a DC voltage for the DC bus 75. The DC voltage is present between a positive rail 77 and a negative rail 79 of the DC bus 75. A DC bus capacitor 74 is connected between the positive and negative rails, 77 and 79, to reduce the magnitude of the ripple voltage resulting from converting the AC voltage to a DC voltage. It is understood that the DC bus capacitor 74 may be a single capacitor or multiple capacitors connected in parallel, in series, or a combination thereof. The magnitude of the DC voltage between the negative and positive rails, 79 and 77, is generally equal to the magnitude of the peak of the AC input voltage.

Figure 5:
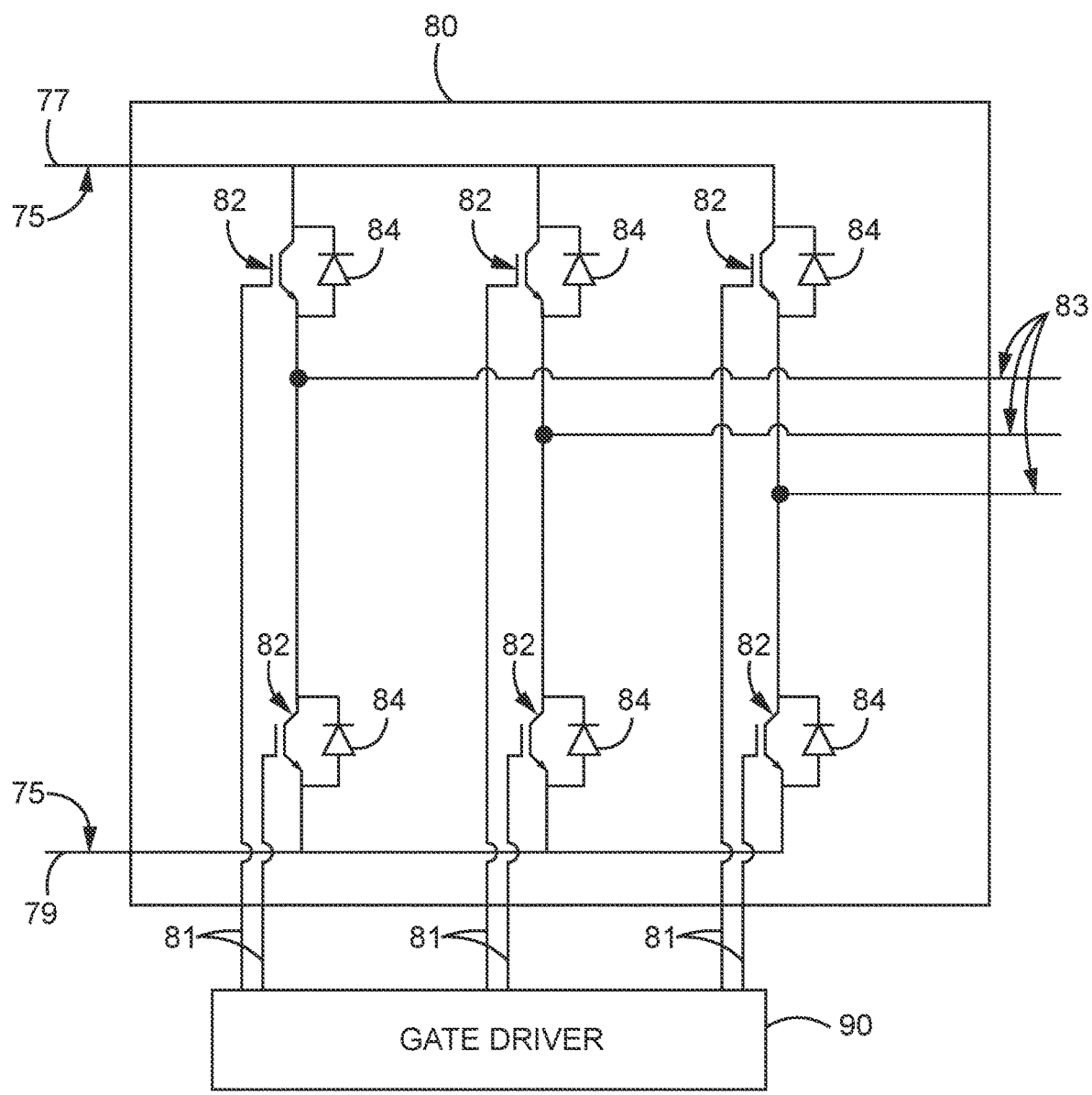
FIG. 5 is a block diagram representation of an inverter section and gate driver module from the motor drive of FIG. 3.

The DC bus 75 is connected in series between the rectifier section 70 and an inverter section 80. Referring also to FIG. 5, the inverter section 80 consists of switching elements, such as transistors, thyristors, or SCRs as is known in the art. The illustrated inverter section 80 includes an insulated gate bipolar transistor (IGBT) 82 and a free-wheeling diode 84 connected in pairs between the positive rail 77 and each phase of the output voltage as well as between the negative rail 79 and each phase of the output voltage. Each of the IGBTs 82 receives gating signals 81 to selectively enable the transistors 82 and to convert the DC voltage from the DC bus 75 into a controlled three phase output voltage to the motor 32. When enabled, each transistor 82 connects the respective rail 77, 79 of the DC bus 75 to an electrical conductor 83 connected between the transistor 82 and the output terminal 35. The electrical conductor 83 is selected according to the application requirements (e.g., the rating of the motor drive 30) and may be, for example, a conductive surface on a circuit board to which the transistors 82 are mounted or a bus bar connected to a terminal from a power module in which the transistors 82 are contained. The output terminals 35 of the motor drive 30 may be connected to the motor 32 via a cable including electrical conductors connected to each of the output terminals 35.

One or more modules are used to control operation of the motor drive 30. According to the embodiment illustrated in FIG. 3, a controller 100 includes the modules and manages execution of the modules. The illustrated embodiment is not intended to be limiting and it is understood that various features of each module discussed below may be executed by another module and/or various combinations of other modules may be included in the controller 100 without deviating from the scope of the invention. The modules may be stored programs executed on one or more processors, logic circuits, or a combination thereof. The controller 100 may be implemented, for example, in a microprocessor, application specific integrated circuit (ASIC), field programmable gate array (FPGA), or other such customizable device. The motor drive 30 also includes a memory device 95 in communication with the controller 100. The memory device 95 may include transitory memory, non-transitory memory, persistent memory, or non-persistent memory, or a combination thereof. The memory device 95 may be configured to store data and programs, which include a series of instructions executable by the controller 100. It is contemplated that the memory device 95 may be a single device, multiple devices, or incorporated, for example, as a portion of another device such as an application specific integrated circuit (ASIC). The controller 100 is in communication with the memory 95 to read the instructions and data as required to control operation of the motor drive 30.

The controller 100 receives a reference signal 97 identifying desired operation of the motor 32 connected to the motor drive 30. The reference signal 97 may be, for example, a position reference ($\theta^*$), a speed reference ($\omega^*$), or a torque reference ($T^*$). For a high-performance servo control system, the reference signal 97 is commonly a position reference signal ($\theta^*$). As will be discussed in more detail below, the illustrated embodiment receives a shaped position reference signal ($\theta^{*'}$) as the reference signal 97.

The controller 100 also receives feedback signals indicating the current operation of the motor drive 30. According to the illustrated embodiment, the controller 100 includes a feedback module 65 that may include, but is not limited to, analog to digital (A/D) converters, buffers, amplifiers, and any other components that would be necessary to convert a feedback signal in a first format to a signal in a second format suitable for use by the controller 100 as would be understood in the art The motor drive 30 may include a voltage sensor 71 and/or a current sensor 73 on the DC bus 75 generating a feedback signal corresponding to the magnitude of voltage and/or current present on the DC bus 75. The motor drive 30 may also include one or more voltage sensors 85 and/or current sensors 87 on the output phase(s) of the inverter section 80 generating a feedback signal corresponding to the magnitude of voltage and/or current present on the electrical conductors 83 between the inverter section 80 and the output 85 of the motor drive. A position feedback device 34 may be connected to the motor 32 and operable to generate a position feedback signal, $\theta$, corresponding to the angular position of the motor 32. The motor drive 30 includes an input configured to receive the position feedback signal from the position feedback device 34. It is contemplated that the input may configured to receive a sinusoidal feedback signal, a square wave, a digital pulse train, a serial communication data packet, or a combination thereof according to the configuration of the position feedback device 34.

The controller 100 utilizes the feedback signals and the reference signal 97 to control operation of the inverter section 80 to generate an output voltage having a desired magnitude and frequency for the motor 32. The feedback signals are processed by the feedback module 65 and converted, as necessary, to signals for the control module 105.

Figure 6:
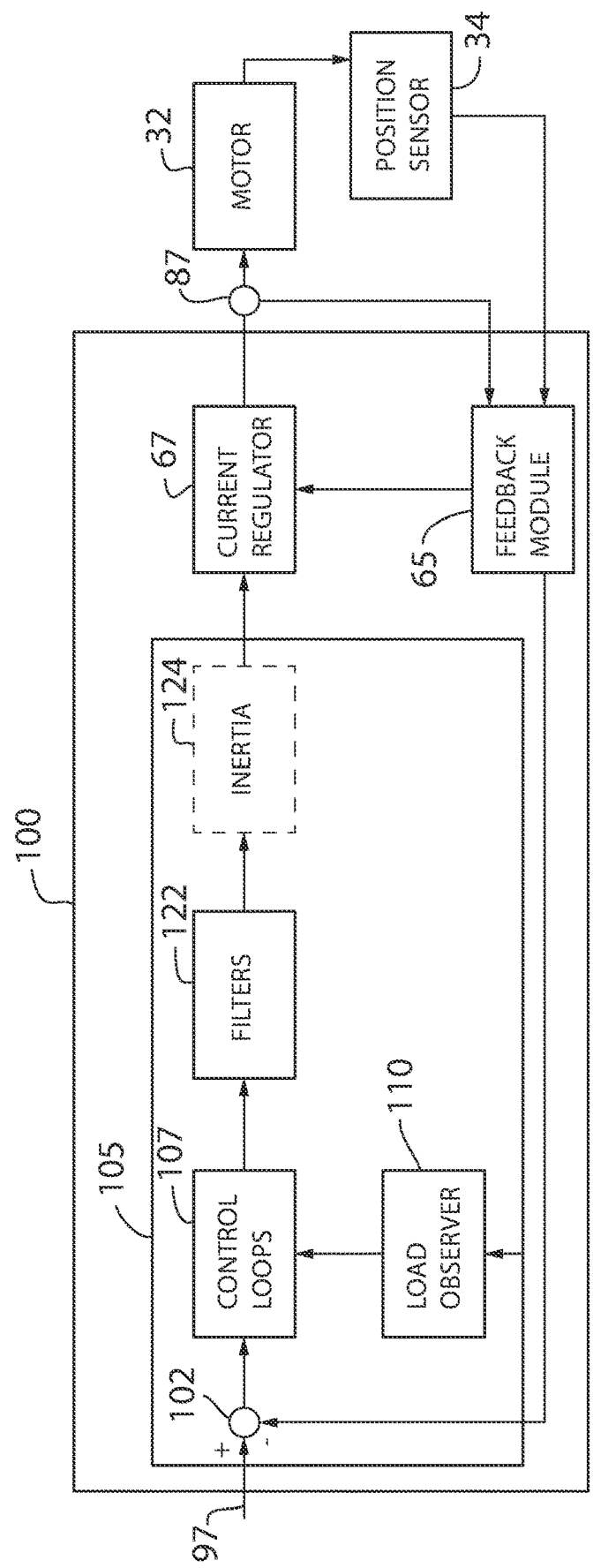
FIG. 6 is a block diagram representation of a controller for the motor drive of FIG. 1.

With reference also to FIG. 6, the control module 105 includes control loops 107 and filters 122, as will be discussed in more detail below, to receive the command signal 97 and a feedback signal, such as a position feedback signal, and execute responsive to the command signal 97 and the feedback signals to generate a desired reference signal. The control module 105 may also include a load observer 110 to generate an estimated response of one or more operating characteristics of the motor 32. The estimated response may be added to the reference signal from the control loops 105 to generate a modified reference signal. One or more filters 122 may be present in the control module 105 to reduce or eliminate undesired components of the modified reference signal. The output of the filter block 122 is a filtered reference signal. As shown in FIG. 6, an optional inertia block 124 may be included in-line with the filters 122. As will be discussed in more detail below, the inertial gain may be included in the inertia block 124 or, optionally, may be incorporated into gains within the control loops 107. The filtered reference signal is provided to the inertia block which outputs a torque reference signal. The torque reference signal is, in turn, output to the current regulator 67. As is understood in the art, the current regulator 67 may independently regulate a torque producing component of the current and a flux producing component of the current. The torque reference signal is provided as an input to the regulator controlling the torque producing component of the current. The current regulator 67 uses the torque reference signal and a current feedback signal to output a voltage signal to a gate driver module 90. The gate driver module 90 generates the gating signals 81, for example, by pulse width modulation (PWM) or by other modulation techniques. The gating signals 81 subsequently enable/disable the transistors 82 to provide the desired output voltage to the motor 32, which, in turn, results in the desired operation of the mechanical load 37 coupled to the motor 32. As is understood in the art, the current regulator 67 is configured to execute at a bandwidth sufficiently greater than the bandwidth of the control module 105 such that the current regulator 67 may be approximated as a unity gain to the control module 105.

Figure 7:
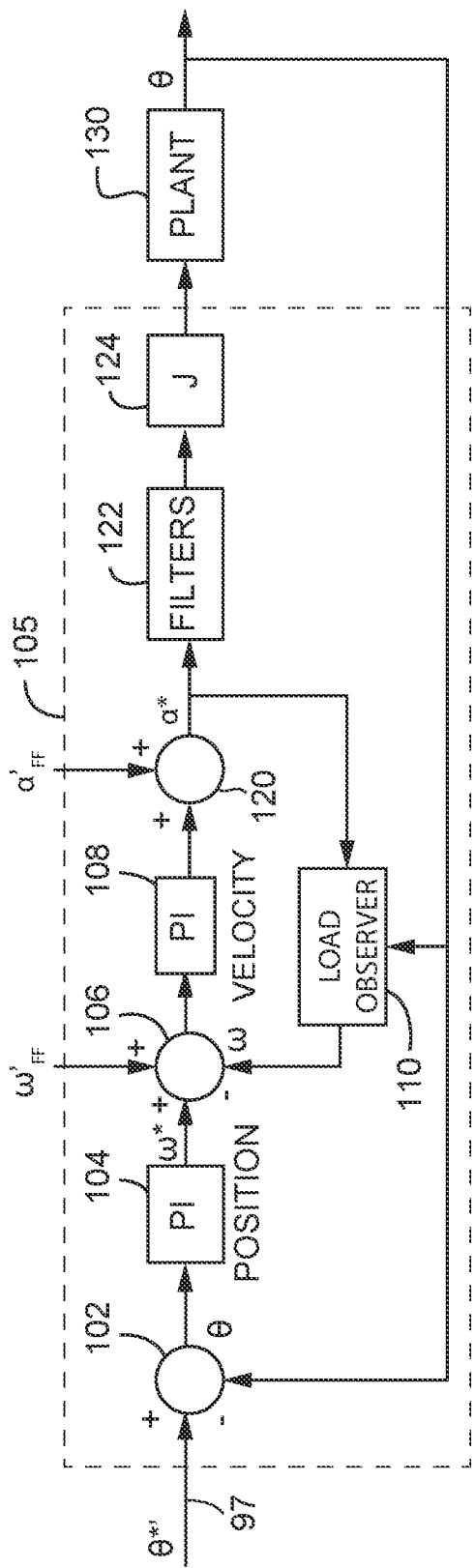
FIG. 7 is a block diagram representation of one embodiment of a control module for the controller of FIG. 6.

Referring next to FIG. 7, a control module 105 according to one embodiment of the invention is illustrated. The control module 105 receives a shaped position command signal ($\theta^{*'}$) 97 as an input. The shaped position command signal ($\theta^{*'}$) 97 is compared to a position feedback signal ($\theta$) at a first summing junction 102. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (I), and/or derivative (D) controllers of the position loop controller 104 includes a controller gain value. The controller gain values are commonly referred to as a proportional gain (Kpp), integral gain (Kpi), and a derivative gain (Kpd). The output of the position loop controller 104 is a velocity reference signal ($\omega^*$).

The velocity reference signal ($\omega^*$) is compared to a velocity feedback signal ($\omega$) at a second summing junction 106. The velocity feedback signal ($\omega$) is generated by a load observer 110. Optionally, the velocity feedback signal ($\omega$) may be determined by taking a derivative of the position feedback signal ($\theta$). A velocity error signal is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an acceleration reference signal.

Figure 10:
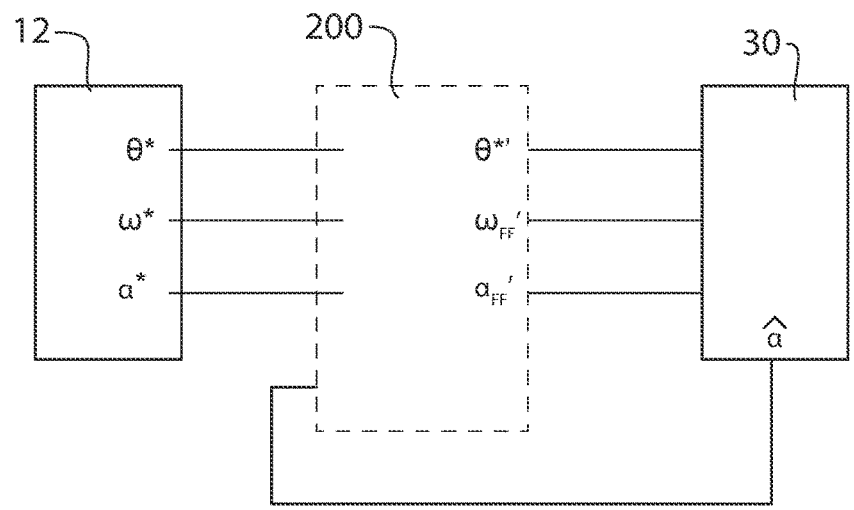
FIG. 10 is a partial block diagram representation of one embodiment of the exemplary industrial control system of FIG. 1.

The control module 105 may also include feed forward branches. According to the illustrated embodiment, the control module 105 includes feed forward branches for both the velocity and the acceleration elements. With reference also to FIG. 10, a trajectory shaping module may be utilized to generate feed forward signals. Operation of the trajectory shaping module 200 will be discussed in more detail below. The trajectory shaping module provides a shaped velocity feed forward signal ($\omega_{FF}'$) and a shaped acceleration feedforward signal ($\alpha_{FF}'$). The shaped velocity feed forward signal ($\omega_{FF}'$) is added to the velocity reference signal and the velocity feedback signal at summing junction 106, and the shaped acceleration feedforward signal ($\alpha_{FF}'$) is added to the acceleration reference signal at a third summing junction 120.

Figure 8:
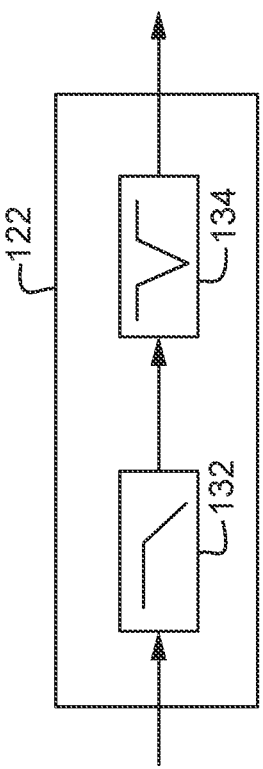
FIG. 8 is a block diagram representation of the filter section from the control module of FIG. 7.

The output of the third summing junction 120 is provided as an input to a filter section 122. The filter section 122 may include one or more filters to remove unwanted components from the control system. Referring also to FIG. 8, the illustrated filter section 122 includes a low pass filter 132 to attenuate undesirable high frequency components and a notch filter 134 to attenuate specific frequency components having an undesirable effect on the controlled mechanical load 37. It is further contemplated that additional filters may be included in the filter section 122 without deviating from the scope of the invention.

According to the embodiment illustrated in FIG. 7, the output of the filter section 122 is provided to an inertia scaling block 124, and the inertia scaling block 124 applies a gain corresponding to the inertia of the controlled system. The gain of the inertia scaling block 124 is identified simply as an inertia, J. The inertial gain may include a motor inertia value, $J_m$, a load inertia value, $J_l$, or a combination thereof. While a motor inertia value may be known, or provided by a motor manufacturer, it may be difficult to accurately identify a load inertia value. The load observer 110 may compensate for inertial gains that either do not include a load inertia or do not accurately represent the load inertia. As indicated above, the output of the control module 105 is provided to a current regulator 67 and gate driver module 90 to output a desired voltage to the motor 32. The plant 130 shown in FIG. 7 represents components of the motor 32 and motor drive 30 external to the control module 105 and may incorporate the current regulator 67, gate module 60, and the inverter section 80 of the motor drive 30, the motor 32, a mechanical load 37, and a position feedback device 34. The position feedback device 34 generates the position feedback signal (q) used by the control module 105.

Figure 9:
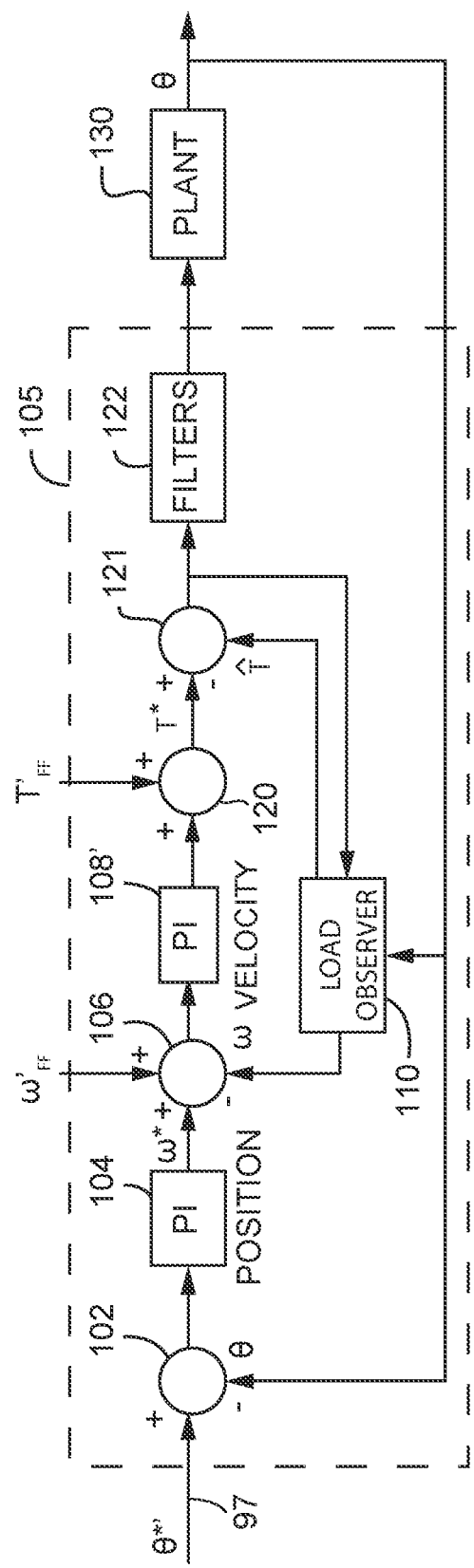
FIG. 9 is a block diagram representation of another embodiment of the control module for the controller of FIG. 6.

Although the reference signal from the control loops 105 is illustrated as an acceleration reference, $\alpha^*$, in FIG. 7, the output of the third summing junction 120 may be an acceleration or torque reference signal. With reference to FIG. 9, the inertial gains from the inertia block 124 may be incorporated into the controller gains. FIG. 9 illustrates a shaped torque feed forward ($T_{FF}'$) and a modified velocity loop controller 108' indicating that the inertial gains have been incorporated within the controller gains. As is understood in the art, angular acceleration is proportional to torque and, more specifically, torque is equal to inertia times the angular acceleration. As a result, the reference signal generated by the control loops 105 is a torque reference, $T^*$, and the estimated response generated by the load observer 110 is an estimated torque, $\hat{T}$, applied to the motor shaft as a result of the load on the motor 32. The torque reference, $T^*$, and the estimated torque, $\hat{T}$, are combined at the fourth summing junction 121 to provide a combined reference signal, which in this embodiment is a combined torque reference signal, as an input to the filter 122. Because the inertial gains have been incorporated with the controller gains, the inertia block 124 shown in FIG. 7 is not required in the exemplary control module 105 illustrated in FIG. 9. The output of the filters 122 is a torque reference that may be provided directly to the current regulator 67.

Figure 14:
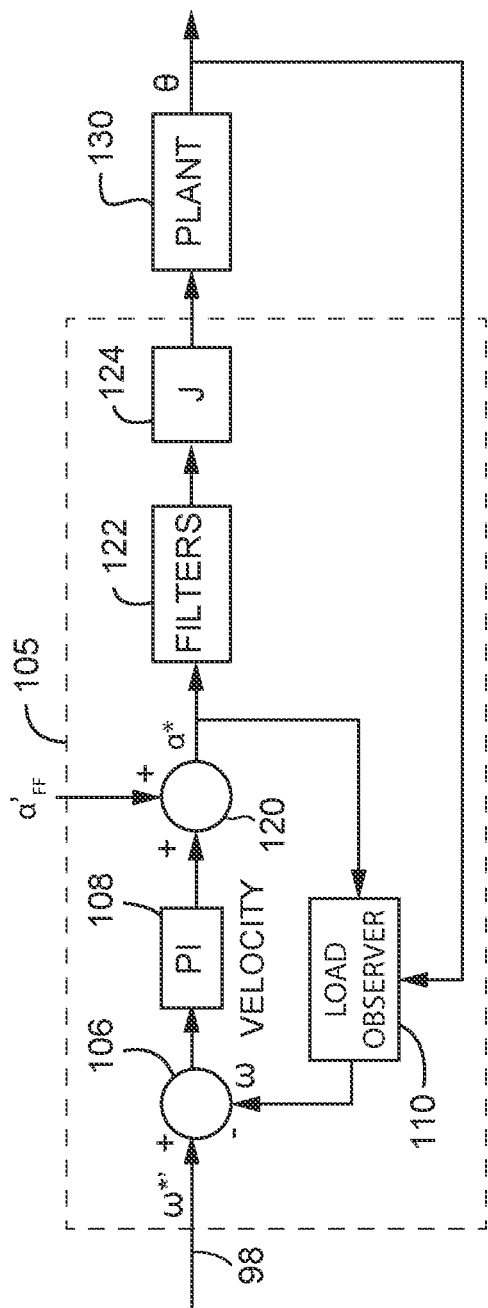
FIG. 14 is a block diagram representation of another embodiment of a control module for the controller of FIG. 6.

In certain applications, position control is not required, and the control module 105 may receive a velocity reference rather than a position reference. Referring next to FIG. 14, a control module 105 according to another embodiment of the invention is illustrated. The control module 105 receives a shaped velocity command signal ($\omega^{*'}$) 98 as an input. The shaped velocity command signal ($\omega^{*'}$) 98 is compared to a velocity feedback signal ($\omega$) at a summing junction 106. The velocity feedback signal ($\omega$) is generated by a load observer 110. Optionally, the velocity feedback signal ($\omega$) may be determined by taking a derivative of the position feedback signal ($\theta$). A velocity error signal is output from the summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an acceleration reference signal.

Figure 16:
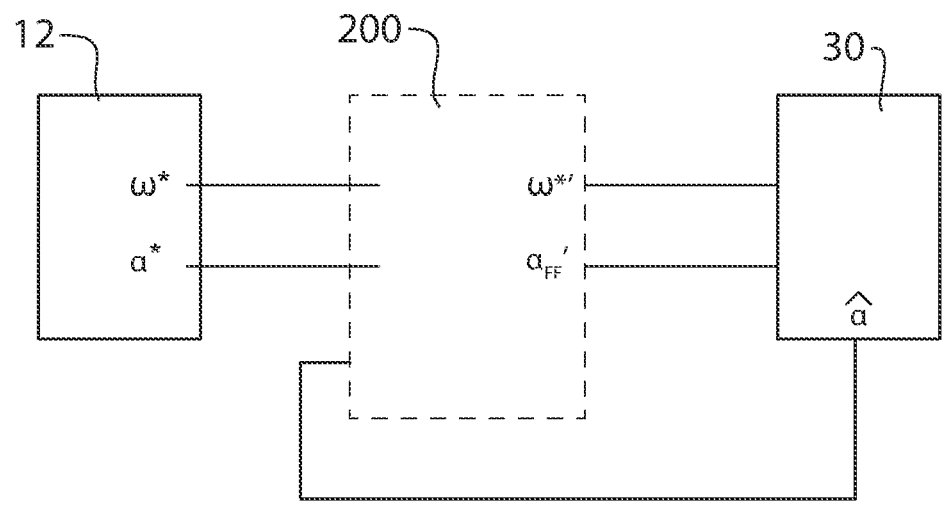
FIG. 16 is a partial block diagram representation of another embodiment of the exemplary industrial control system of FIG. 1.

The control module 105 may also include a feed forward branch. According to the embodiment in FIG. 14, the control module 105 includes a feed forward branch for the acceleration element. With reference also to FIG. 16, a trajectory shaping module may be utilized to generate feed forward signals. Operation of the trajectory shaping module 200 will be discussed in more detail below. The trajectory shaping module 200 provides the shaped velocity command signal ($\omega^{*'}$) and a shaped acceleration feedforward signal ($\alpha_{FF}'$). The shaped acceleration feedforward signal ($\alpha_{FF}'$) is added to the acceleration reference signal at another summing junction 120.

The output of the summing junction 120 is provided as an input to a filter section 122. The filter section 122 may include one or more filters to remove unwanted components from the control system. Referring again to FIG. 8, the illustrated filter section 122 includes a low pass filter 132 to attenuate undesirable high frequency components and a notch filter 134 to attenuate specific frequency components having an undesirable effect on the controlled mechanical load 37. It is further contemplated that additional filters may be included in the filter section 122 without deviating from the scope of the invention.

According to the embodiment illustrated in FIG. 14, the output of the filter section 122 is provided to an inertia scaling block 124, and the inertia scaling block 124 applies a gain corresponding to the inertia of the controlled system. The gain of the inertia scaling block 124 is identified simply as an inertia, J. The inertial gain may include a motor inertia value, $J_m$, a load inertia value, $J_l$, or a combination thereof. While a motor inertia value may be known, or provided by a motor manufacturer, it may be difficult to accurately identify a load inertia value. The load observer 110 may compensate for inertial gains that either do not include a load inertia or do not accurately represent the load inertia. As indicated above, the output of the control module 105 is provided to a current regulator 67 and gate driver module 90 to output a desired voltage to the motor 32. The plant 130 shown in FIG. 14 represents components of the motor 32 and motor drive 30 external to the control module 105 and may incorporate the current regulator 67, gate module 60, and the inverter section 80 of the motor drive 30, the motor 32, a mechanical load 37, and a position feedback device 34. The position feedback device 34 generates the position feedback signal ($\theta$) used by the control module 105.

Figure 15:
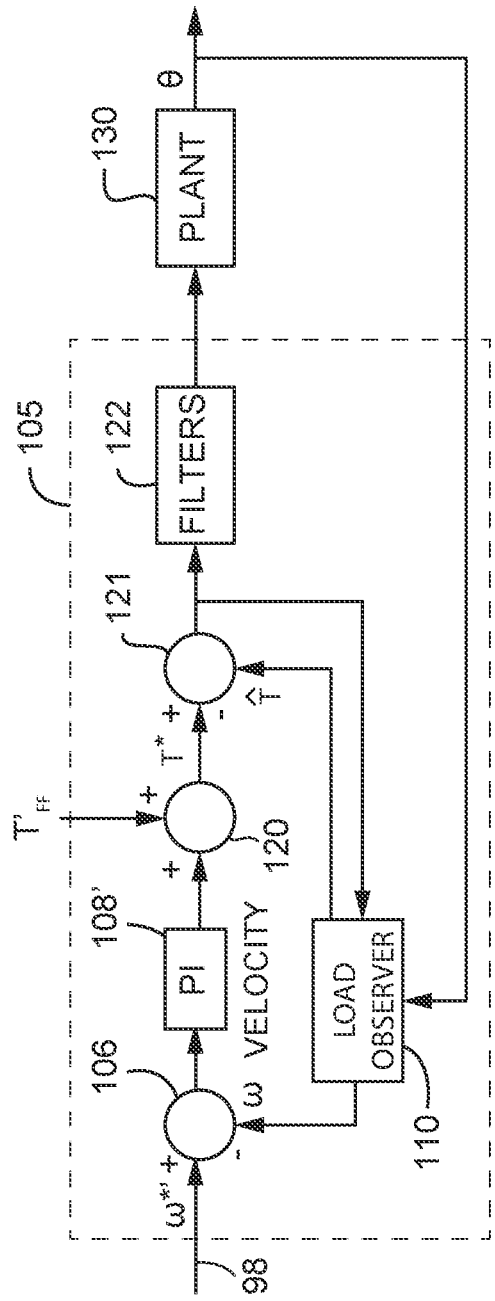
FIG. 15 is a block diagram representation of another embodiment of the control module for the controller of FIG. 6.

Although the reference signal from the control loops 105 is illustrated as an acceleration reference, $\alpha^*$, in FIG. 14, the output of the summing junction 120 may be an acceleration or torque reference signal. With reference to FIG. 15, the inertial gains from the inertia block 124 may be incorporated into the controller gains. FIG. 15 illustrates a shaped torque feed forward ($T_{FF}'$) and a modified velocity loop controller 108' indicating that the inertial gains have been incorporated within the controller gains. As is understood in the art, angular acceleration is proportional to torque and, more specifically, torque is equal to inertia times the angular acceleration. As a result, the reference signal generated by the control loops 105 is a torque reference, $T^*$, and the estimated response generated by the load observer 110 is an estimated torque, $\hat{T}$, applied to the motor shaft as a result of the load on the motor 32. The torque reference, $T^*$, and the estimated torque, $\hat{T}$, are combined at an additional summing junction 121 to provide a combined reference signal, which in this embodiment is a combined torque reference signal, as an input to the filter 122. Because the inertial gains have been incorporated with the controller gains, the inertia block 124 shown in FIG. 14 is not required in the exemplary control module 105 illustrated in FIG. 15. The output of the filters 122 is a torque reference that may be provided directly to the current regulator 67.

FIGS. 7 and 14 illustrate one embodiment of the invention in which the outputs of the trajectory shaping module 200, discussed in more detail below, are provided to the control module 105 of the motor drive to automatically shape the trajectory. It is also contemplated that the outputs of the trajectory shaping module 200 (i.e., a shaped position reference signal, $\theta^{*'}$, if present; a shaped velocity feed forward signal, $\omega_{FF}'$; and a shaped acceleration feedforward signal, $\alpha_{FF}'$) may be used in a diagnostic capacity. The original reference signals, a position reference signal, $\theta^*$, if present; a velocity reference signal, $\omega^*$; and an acceleration reference signal, $\alpha^*$, may be used in the control module 105 and the outputs of the trajectory shaping module 200 may be compared to the original reference signals. When the original reference signals define a feasible trajectory that the motor drive 30 is able to follow, there is no difference between the original and the shaped reference signals. When the original reference signals define a trajectory that the motor drive 30 is not able to follow, the shaped reference signals differ from the original reference signals. A message may be generated alerting a technician to the unfeasible trajectory, but no further action may be taken, allowing the motor drive 30 to follow the trajectory as best as it is able.

According to still another embodiment of the invention, it is contemplated that the calculations for the control module 105 may be performed in a per unit system. A per unit system employs scaling factors to convert values in physical units to values in a percentage, or per unit value, where the expected operational range for the value is converted to a value between zero and one or between zero and one hundred percent. Depending on the per unit system, a range of zero to one hundred percent acceleration may be equivalent to a range of zero to one hundred percent torque. As a result, a per unit value of acceleration would be equivalent to a per unit value of torque. Each reference signal and the filtered reference signal in the per unit system would be a unitless reference signal.

In still other embodiments, the inertia of the motor may be included in a filter gain to convert the acceleration reference signal output from the third summing junction 120 to a torque reference signal in the filter section 122. Combining the inertial gain with another controller gain or with the filter gain reduces the real time computational burden imposed on the controller 100 of the motor drive 30.

In operation, the trajectory shaping module 200 receives one or more reference signals from a motion controller and generates shaped, or modified, command signals for a motor drive 30 to control operation of a motor 32. With reference to FIG. 10, the illustrated embodiment contemplates the motion controller being included in the industrial controller 12 and including a position reference signal. The trajectory shaping module 200 will be discussed first according to the embodiment including a position reference signal and then according to the embodiment which does not require a position reference signal. The motion controller of FIG. 10 generates a motion command including a position reference signal, $\theta^*$; a velocity reference signal, $\omega^*$; an acceleration reference signal, $\alpha^*$; or a combination thereof. As is understood in the art, velocity is the derivative of position with respect to time and acceleration is the derivative of velocity with respect to time. Thus, having one of the reference signals, each of the other reference signals may be determined. Preferably, the motion command provides each of the position, velocity, and acceleration reference signals. A motor drive 30 includes a load observer 110 (see also FIG. 3) configured to generate an estimated acceleration, $\hat{a}$. The estimated acceleration, $\hat{a}$, is provided along with the position reference signal, $\theta^*$; velocity reference signal, $\omega^*$; and acceleration reference signal, $\alpha^*$, to a trajectory shaping module 200. As indicated above, it is contemplated that the trajectory shaping module 200 may be executed in the industrial controller 12 or in the motor drive 30. For purposes of discussion herein, the trajectory shaping module 200 will be discussed with respect to being executed by the motor drive. The trajectory shaping module 200 generates a shaped position reference signal, $\theta^{*\prime}$; a shaped velocity feed forward signal, $\omega_{FF}'$; and a shaped acceleration feedforward signal, $\alpha_{FF}'$, for the controller 100 in the motor drive 30.

Figure 11:
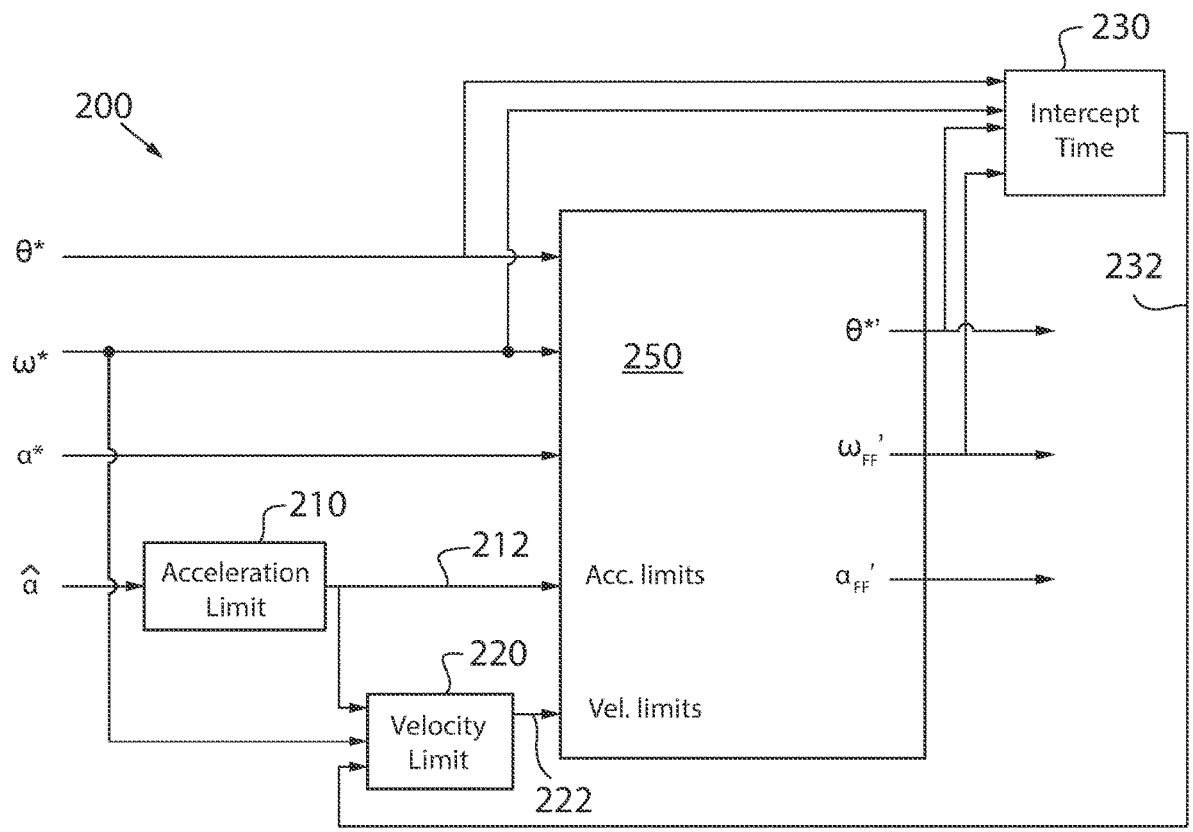
FIG. 11 is a block diagram representation of one embodiment of a trajectory shaping module of FIG. 10.

Turning next to FIG. 11, the trajectory shaping module 200 includes an acceleration limiting module 210, a velocity limiting module 220, an intercept time module 230, and a state filter module 250. The acceleration limiting module 210 dynamically determines acceleration limits for the motor drive 30 in real-time in response to the estimated acceleration, a, determined by the motor drive. Initial values for an acceleration limit may be stored in the memory 95 of the motor controller. According to one embodiment of the invention, the acceleration limit may be a single value, corresponding to a maximum acceleration in both a positive and a negative direction. According to another embodiment of the invention, the acceleration limit may include a first value, defining a maximum acceleration, also referred to herein as an upper acceleration limit, and a minimum acceleration, also referred to herein as a lower acceleration limit. If a motor operates in a single direction of rotation, it is contemplated that both the upper and lower acceleration limits may have the same sign. If a motor operates in both directions of rotation, it is contemplated that the upper acceleration limit may have a maximum acceleration value in a positive direction, and the lower acceleration limit may have a maximum acceleration value in a negative direction. Further, the acceleration limit may be stored as a value in real units, such as meters per second squared, as a percentage of a desired acceleration, or as a per unit value expressed as a decimal value, where a value between zero and one corresponds to zero to one hundred percent. For ease of computational efficiency, it is desirable to store one or both acceleration limit values in a manner consistent with the units utilized by the control loops 107 in the controller 100. For purposes of discussion herein, the motor drive 30 incorporating the illustrated trajectory shaping module 200 stores an upper acceleration limit and a lower acceleration limit having values between positive and negative one, where the values correspond to values between positive and negative one hundred percent of maximum acceleration for the motor 32, where the sign of the acceleration limit corresponds to a direction of rotation of the motor. The acceleration limiting module 210 reads the acceleration limit from the memory and adds the estimated acceleration, a, determined by the motor drive, to each of the positive and negative acceleration limits. The modified acceleration limits 212 include a modified positive acceleration limit and a modified negative acceleration limit. The modified acceleration limits 212 are output from the acceleration limiting module 210 and provided as inputs to both the velocity limiting module 220 and the state filter module 250.

The velocity limiting module 220 dynamically determines velocity limits for the motor drive 30 in real-time in response to the determination of the acceleration limits by the acceleration limiting module 210. In addition to the modified acceleration limits 212, the velocity limiting module 220 also receives the velocity reference signal, $\omega^*$, from the motion command and the intercept time 232 as determined by the intercept time module 230 and as discussed in more detail below. The intercept time 232 corresponds to an approximate time at which the controller 100 will be able to force existing position error in the controlled system to coverage to zero based on the present limits imposed on acceleration and velocity. As an initial step, the velocity limiting module 220 multiplies the intercept time 232 against each of the modified upper and lower acceleration limits as determined by the acceleration limiting module 210. Each of the resultant values is added to the velocity reference signal. Because the upper acceleration limit is a positive value and the lower acceleration limit is a negative value, summation of the resultant values after multiplying the intercept time will add and subtract a desired amount from the velocity reference signal. The higher value becomes the velocity upper limit and the lower value becomes the velocity lower limit. These limits are output as the modified velocity limit 222 from the velocity limiting module 220 and provided to the state filter module 250. The modified velocity limit 222 will define an acceptable range for the velocity reference within the state filter 250 which encompasses the original velocity reference signal, $\omega^*$ from the motion command.

The intercept time module 230 determines an approximate time at which the controller 100 will be able to force existing position error in the controlled system to coverage to zero based on the present limits imposed on acceleration and velocity. The intercept time module 230 receives the position reference signal, $\theta^*$, and the velocity reference signal, $\omega^*$, from the motion command as inputs. The intercept time module 230 also receives as inputs the shaped position reference signal, $\theta^{*\prime}$, and the shaped velocity reference signal, $\omega_{FF}'$, from the modified motion command, which are output from the state filter module 250. The intercept time module 230 determines a position error by finding a difference between the position reference signal and the shaped position reference signal. The intercept time module 230 similarly determines a velocity error by finding a difference between the velocity reference signal and the shaped velocity reference signal. According to a first embodiment of the invention, the intercept time module 230 divides the position error by the velocity error in order to determine the intercept time 232 being output from the intercept time module 230. According to another embodiment of the invention, the intercept time module 230 first compensates the position error with a correction factor accounting for deceleration. The position error may be fed back through a gain block, providing correction for deceleration, to a summing junction and added to the initial position error to determine a modified position error. This modified position error may then be divided by the velocity error to determine the intercept time 232. The initial determination of intercept time considers correcting velocity error at full velocity. However, as the position error and velocity error decrease, the rate at which correction occurs may decrease and the amount of time required to bring the existing position error in the controlled system to zero may increase. The gain block in the feedback path may be adjusted such that the position error may be increased accordingly, allowing for a more accurate determination of intercept time 232.

Figure 12:
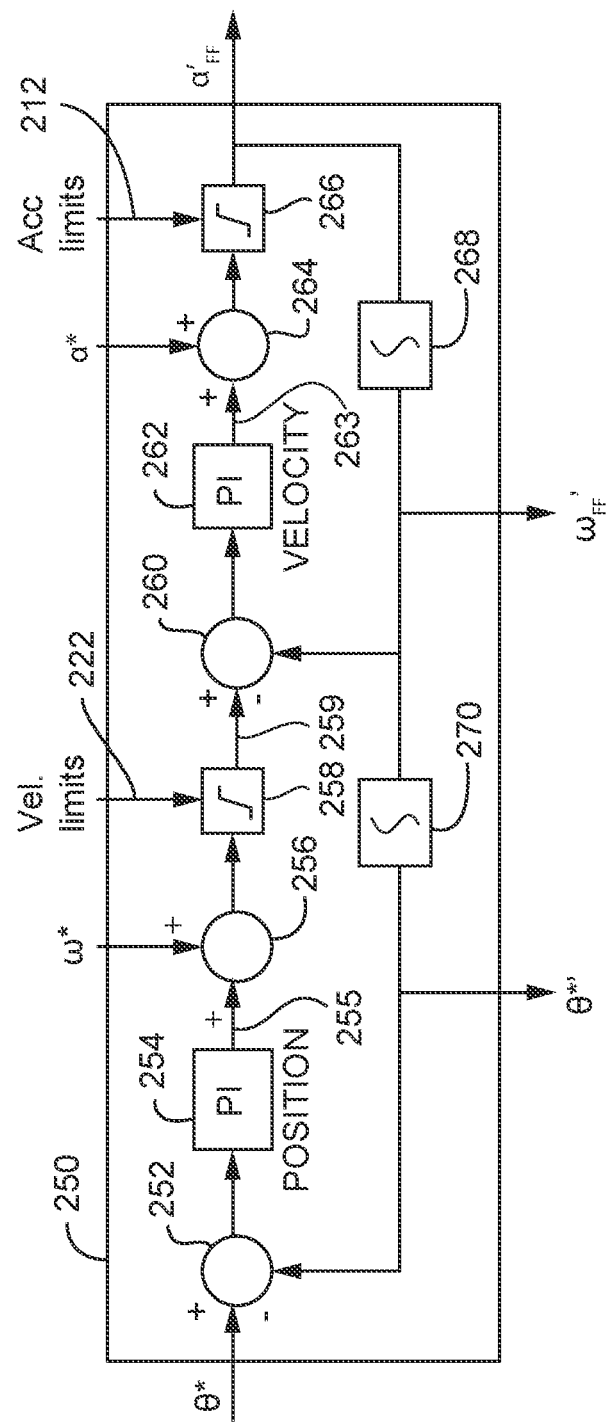
FIG. 12 is a block diagram representation of one embodiment of a state filter for the trajectory shaping module of FIG. 11.

With reference to FIGS. 11 and 12, the state filter 250 is configured to receive the original motion command and to shape the motion command into a modified motion command when needed to achieve a more feasible motion profile. The state filter 250 receives the position reference signal, $\theta^*$; velocity reference signal, $\omega^*$; and acceleration reference signal, $\alpha^*$, of the motion command as inputs. The state filter 250 also receives the acceleration limits 212 determined by the acceleration limiting module 210 and the velocity limits 222 determined by the velocity limiting module 220 as inputs. The state filter 250 further obtains values of the controller gains utilized in the control module 105 and determines a modified motion command as a function of the initial motion command, the acceleration limits, the velocity limits, and the controller gains.

The state filter 250 includes a model of the control module 105 being executed by the motor drive 30. The model includes a model of the position loop 254 and a model of the velocity loop 262. The position reference signal, $\theta^*$, is provided initially to a first summing junction 252 where it is compared to the shaped position reference signal, $\theta^{*\prime}$. The output of the first summing junction 252 is an estimated position error which is provided to the model of the position loop 254. When the state filter 250 is executing within the motor drive 30, the state filter may read the controller gains for the control module 105 which are stored as parameters in the memory 95 of the motor drive 30. According to the illustrated embodiment, the model of the position loop 254 corresponds to the position loop controller 104, modeling a proportional and an integral (PI) controller. If the position loop controller 104 is just a proportional (P) controller or further include a derivative (D) controller, the model of the position loop 254 would similarly correspond to a proportional controller or a proportional-integral-derivative controller. Each of the proportional (P), integral (I), and/or derivative (D) controllers of the position loop controller 104 includes a controller gain value. The controller gain values are commonly referred to as a proportional gain (Kpp), integral gain (Kpi), and a derivative gain (Kpd). The model of the position loop controller 254 reads each of the gains, according to the appropriate model 254 and determines an estimated velocity command 255.

The estimated velocity command 255 is combined with the velocity reference signal, $\omega^*$, at a second summing junction 256. Thus, the velocity reference signal, $\omega^*$, serves as a feed-forward signal to the modelled control system. In a similar manner, the shaped velocity reference signal, $\omega_{FF}'$, will serve as a feed-forward signal in the control module 105. The output of the second summing junction 256 is provided as an input to a velocity limiting block 258. The velocity limiting block 258 receives the dynamically determined velocity limits 222 and prevents the output of the second summing junction 256 from exceeding the upper velocity limit or from being less than the lower velocity limit. The output of the velocity limiting block 258 is a limited velocity command 259 which is, in turn, provided to a third summing junction 260. The limited velocity command 259 is compared to the shaped velocity reference signal, $\omega_{FF}'$, at the third summing junction 260.

The output of the third summing junction 260 is an estimated velocity error which is provided to the model of the velocity loop 262. When the state filter 250 is executing within the motor drive 30, the state filter may read the controller gains for the control module 105 which are stored as parameters in the memory 95 of the motor drive 30. According to the illustrated embodiment, the model of the velocity loop 262 corresponds to the velocity loop controller 108, modeling a proportional and an integral (PI) controller. If the velocity loop controller 108 is just a proportional (P) controller or further include a derivative (D) controller, the model of the velocity loop 262 would similarly correspond to a proportional controller or a proportional-integral-derivative controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The model of the velocity loop controller 262 reads each of the gains, according to the appropriate model 262 and determines an estimated acceleration command 263.

The estimated acceleration command 263 is combined with the acceleration reference signal, $\alpha^*$, at a fourth summing junction 264. Thus, the acceleration reference signal, $\alpha^*$, serves as a feed-forward signal to the modelled control system. In a similar manner, the shaped acceleration reference signal, $\alpha_{FF}'$, will serve as a feed-forward signal in the control module 105. The output of the fourth summing junction 264 is provided as an input to an acceleration limiting block 266. The acceleration limiting block 266 receives the dynamically determined acceleration limits 212 and prevents the output of the fourth summing junction 264 from exceeding the upper acceleration limit or from being less than the lower acceleration limit. The output of the acceleration limiting block 266 is the shaped acceleration reference signal, $\alpha_{FF}'$. The shaped acceleration reference signal, $\alpha_{FF}'$. is passed through a first integral block 268 and a second integral block 270 to obtain the shaped velocity reference signal, $\omega_{FF}'$, and the shaped position reference signal, $\theta_{FF}'$.

Figure 13:
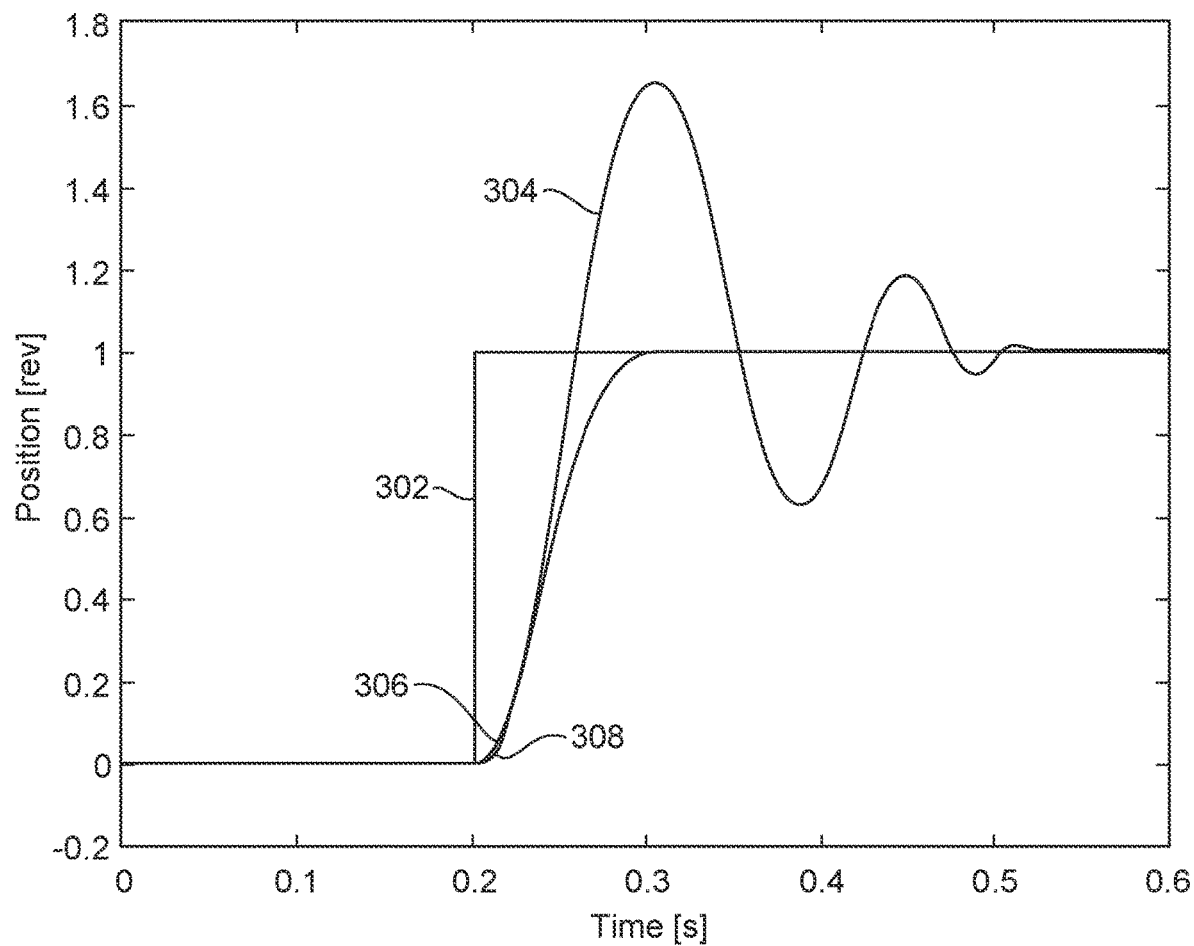
FIG. 13 is a graphical representation of the performance of one embodiment of the trajectory shaping module of FIG. 10.

Turning next to FIG. 13, exemplary performance of the trajectory shaping module 200 is illustrated. A first plot 302 illustrates an exemplary step command provided as position reference signal, $\theta^*$, to the motor drive 30. A step change in position, however, is not a feasible trajectory for a motor 32 to follow. Some time is required for a motor 32 to accelerate up to speed and decelerate back to zero speed at the desired position. A second plot 304 illustrates an exemplary angular position path of the motor resulting from such a step change command without the trajectory shaping module 200. The control module 105 in the motor drive 30 would command the motor 32 to achieve the desired position as fast as possible. Some overshoot occurs as the motor drive 30 recognizes that the motor 32 has achieved the commanded position but before the motor drive 30 can bring the motor to a stop, some ringing occurs as the motor drive 30 causes the motor 32 to oscillate back and forth around the commanded position for about two-tenths of a second before finally settling at the commanded position.

In contrast, a third plot 306 illustrates the performance of the trajectory shaping module 200. The trajectory shaping module 200 receives the step command for the position reference signal, $\theta^*$, and converts the step command to the illustrated curved reference signal 306. The illustrated curved reference signal is the modified position reference signal, $\theta^{*'}$, output from the trajectory shaping module 200 and provided instead of a step command as an input to the control module 105. The control module 105 is able to follow this modified position reference signal. The fourth plot 308 in FIG. 13 illustrates the actual angular position of the motor 32 in response to the modified position reference signal. A small delay in following the modified position reference signal occurs at the start of the command, but then the control module 105 brings the position error to very near zero. The position error remains very near zero throughout the ramp and only a small overshoot occurs at the end of the modified position reference signal with the control module 105 quickly bringing the motor to the commanded speed. As a result of the trajectory shaping module 200, the motor is able to achieve the desired position reference in about one-half the time required to respond to a step change and without the oscillation around the desired position illustrated in the second plot 304.

The trajectory shaping module 200 operates in real time to modify a motion command from the industrial controller 12 as needed. In certain applications, the motion command from the industrial controller may take the form the third plot 306 in FIG. 13 and no modification of the motion command may be necessary. The industrial controller 12 may have knowledge, for example, of the motor inertia, the load inertia, coupling between the motor and the load and other system dynamics and be able to generate feasible command trajectories for the motor drive 30 and motor 32 to follow. In other applications, it may not be possible to accurately model the system dynamics or to know the load inertia in the system. While the industrial controller 12 may generate a feasible trajectory in some instances, in other instances, the motion command or the load coupled to the motor may be such that the motor drive 30 is unable to control the motor 32 to follow the desired position reference. As the motion command passes through the trajectory shaping module 200, the trajectory shaping module 200 may allow feasible commands to pass through unshaped, may shape unfeasible commands, and smoothly transitions between the feasible and shaped motion commands. The output of the trajectory shaping module 200 is provided as an input to the control module 105 and the control module 105 executes to regulate the current output to the motor in parallel with the trajectory shaping module 200 generating a feasible command trajectory.

With reference next to FIG. 16, the illustrated embodiment contemplates the motion controller being included in the industrial controller 12 and not requiring a position reference signal. The motion controller of FIG. 16 generates a motion command including a velocity reference signal, $\omega^*$; an acceleration reference signal, $\alpha^*$; or a combination thereof. As is understood in the art, acceleration is the derivative of velocity with respect to time. Thus, having one of the reference signals, the other reference signal may be determined. Preferably, the motion command provides each of the velocity and acceleration reference signals. A motor drive 30 includes a load observer 110 (see also FIG. 3) configured to generate an estimated acceleration, â. The estimated acceleration, â, is provided along with the velocity reference signal, $\omega^*$ and acceleration reference signal, $\alpha^*$, to a trajectory shaping module 200. As indicated above, it is contemplated that the trajectory shaping module 200 may be executed in the industrial controller 12 or in the motor drive 30. For purposes of discussion herein, the trajectory shaping module 200 will be discussed with respect to being executed by the motor drive. The trajectory shaping module 200 generates a shaped velocity command signal, $\omega^{*'}$; and a shaped acceleration feedforward signal, $\alpha_{FF}'$, for the controller 100 in the motor drive 30.

Figure 17:
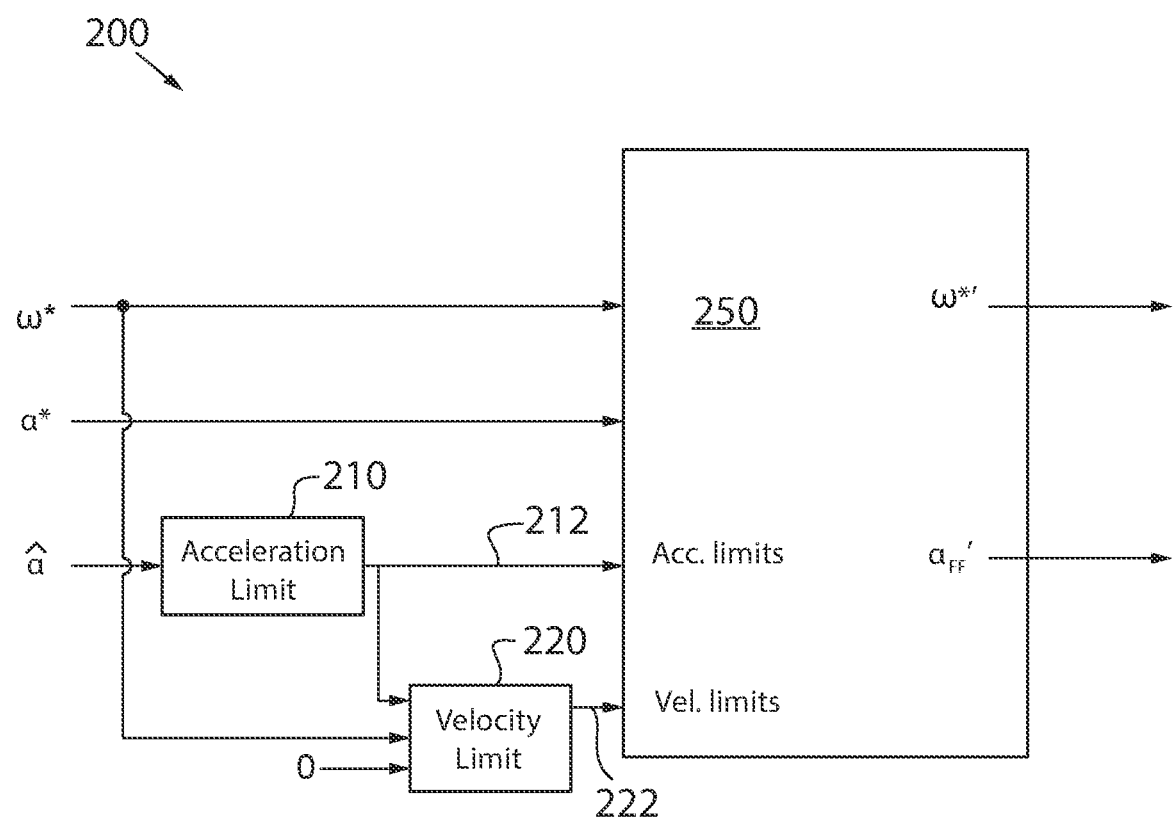
FIG. 17 is a block diagram representation of one embodiment of a trajectory shaping module of FIG. 16.

Turning next to FIG. 17, the trajectory shaping module 200 includes an acceleration limiting module 210, a velocity limiting module 220, and a state filter module 250. The acceleration limiting module 210 dynamically determines acceleration limits for the motor drive 30 in real-time in response to the estimated acceleration, a, determined by the motor drive. Initial values for an acceleration limit may be stored in the memory 95 of the motor controller. According to one embodiment of the invention, the acceleration limit may be a single value, corresponding to a maximum acceleration in both a positive and a negative direction. According to another embodiment of the invention, the acceleration limit may include a first value, defining a maximum acceleration, also referred to herein as an upper acceleration limit, and a minimum acceleration, also referred to herein as a lower acceleration limit. If a motor operates in a single direction of rotation, it is contemplated that both the upper and lower acceleration limits may have the same sign. If a motor operates in both directions of rotation, it is contemplated that the upper acceleration limit may have a maximum acceleration value in a positive direction, and the lower acceleration limit may have a maximum acceleration value in a negative direction. Further, the acceleration limit may be stored as a value in real units, such as meters per second squared, as a percentage of a desired acceleration, or as a per unit value expressed as a decimal value, where a value between zero and one corresponds to zero to one hundred percent. For ease of computational efficiency, it is desirable to store one or both acceleration limit values in a manner consistent with the units utilized by the control loops 107 in the controller 100. For purposes of discussion herein, the motor drive 30 incorporating the illustrated trajectory shaping module 200 stores an upper acceleration limit and a lower acceleration limit having values between positive and negative one, where the values correspond to values between positive and negative one hundred percent of maximum acceleration for the motor 32, where the sign of the acceleration limit corresponds to a direction of rotation of the motor. The acceleration limiting module 210 reads the acceleration limit from the memory and adds the estimated acceleration, a, determined by the motor drive, to each of the positive and negative acceleration limits. The modified acceleration limits 212 include a modified positive acceleration limit and a modified negative acceleration limit. The modified acceleration limits 212 are output from the acceleration limiting module 210 and provided as inputs to both the velocity limiting module 220 and the state filter module 250.

The velocity limiting module 220 dynamically determines velocity limits for the motor drive 30 in real-time in response to the determination of the acceleration limits by the acceleration limiting module 210. When no position regulation is required, the velocity limiting module 220 replaces the intercept time input, as shown in FIG. 11, with a fixed zero input. The intercept time module 230 is not required for a velocity reference because the intercept time determines an approximate amount of time that the controller 100 requires to force existing position error in the controlled system to converge to zero. Because the controlled system in this embodiment is not utilizing a position reference or a position controller, there is no position error. As a result, there is no convergence time required and the input may be set to zero. As previously discussed, the velocity limiting module 220 multiplies the intercept time 232 against each of the modified upper and lower acceleration limits as determined by the acceleration limiting module 210. Because this input has been set to zero, the resultant values are zero. Each of the resultant values may still be added to the velocity reference signal, providing the limits for the velocity reference signal. In other words, the velocity reference signal output from the controller 12 is maintained as its original value. In combination with the prior discussed embodiment, setting the input from the intercept time calculation to zero allows a single control module 105 to implement a single state filter regardless of whether position control or velocity control is desired. When position control is desired, operation of the state filter 250 occurs as described above with respect to FIGS. 10-12. When velocity control is desired, operation of the state filter 250 assumes zero position reference and zero position error, converging to operation as described in FIGS. 16-18. It is contemplated that some applications may be configured exclusively to handle velocity control and the velocity limiting module 220 may be eliminated to reduce computational demands.

Figure 18:
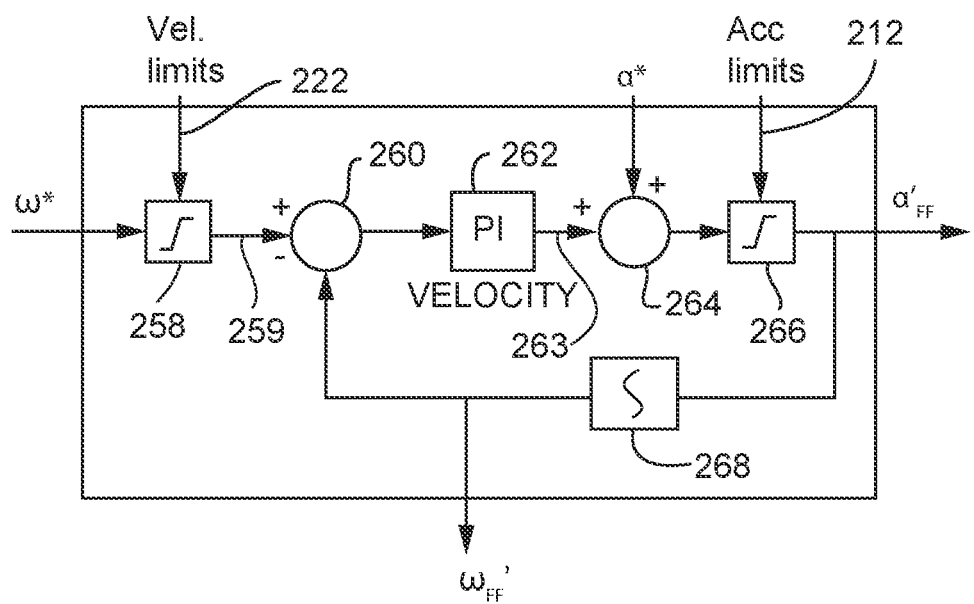
FIG. 18 is a block diagram representation of one embodiment of a state filter for the trajectory shaping module of FIG. 17.

With reference to FIGS. 17 and 18, the state filter 250 is configured to receive the original motion command and to shape the motion command into a modified motion command when needed to achieve a more feasible motion profile. The state filter 250 receives the velocity reference signal, $\omega^*$, and the acceleration reference signal, $\alpha^*$, of the motion command as inputs. The state filter 250 also receives the acceleration limits 212 determined by the acceleration limiting module 210 and the velocity limits 222 determined by the velocity limiting module 220 as inputs. The state filter 250 further obtains values of the controller gains utilized in the control module 105 and determines a modified motion command as a function of the initial motion command, the acceleration limits, the velocity limits, and the controller gains.

The state filter 250 includes a model of the control module 105 being executed by the motor drive 30, including a model of the velocity loop 262. The velocity reference signal, $\omega^*$, is provided as an input to a velocity limiting block 258. The velocity limiting block 258 receives the dynamically determined velocity limits 222 and prevents the output of the second summing junction 256 from exceeding the upper velocity limit or from being less than the lower velocity limit. The output of the velocity limiting block 258 is a limited velocity command 259 which is, in turn, provided to a first summing junction 260. As discussed above, when the motor drive 30 is receiving only a velocity reference signal and not a position reference signal, the velocity limits are configured to maintain the velocity reference signal at its original value. It is contemplated, therefore, that the state filter 250 may execute without the velocity limiting block 258 and pass the velocity reference signal directly to the first summing junction 260. The limited velocity command 259 is compared to the shaped velocity reference signal, $\omega_{FF}'$, at the first summing junction 260.

The output of the first summing junction 260 is an estimated velocity error which is provided to the model of the velocity loop 262. When the state filter 250 is executing within the motor drive 30, the state filter may read the controller gains for the control module 105 which are stored as parameters in the memory 95 of the motor drive 30. According to the illustrated embodiment, the model of the velocity loop 262 corresponds to the velocity loop controller 108, modeling a proportional and an integral (PI) controller. If the velocity loop controller 108 is just a proportional (P) controller or further include a derivative (D) controller, the model of the velocity loop 262 would similarly correspond to a proportional controller or a proportional-integral-derivative controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The model of the velocity loop controller 262 reads each of the gains, according to the appropriate model 262 and determines an estimated acceleration command 263.

The estimated acceleration command 263 is combined with the acceleration reference signal, $\alpha^*$, at a second summing junction 264. Thus, the acceleration reference signal, $\alpha^*$, serves as a feed-forward signal to the modelled control system. In a similar manner, the shaped acceleration reference signal, $\alpha_{FF}'$, will serve as a feed-forward signal in the control module 105. The output of the second summing junction 264 is provided as an input to an acceleration limiting block 266. The acceleration limiting block 266 receives the dynamically determined acceleration limits 212 and prevents the output of the second summing junction 264 from exceeding the upper acceleration limit or from being less than the lower acceleration limit. The output of the acceleration limiting block 266 is the shaped acceleration reference signal, $\alpha_{FF}'$. The shaped acceleration reference signal, $\alpha_{FF}'$, is passed through an integral block 268 to obtain the shaped velocity reference signal, $\omega_{FF}'$.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for shaping a motion command for a motor, the system comprising:
an input configured to receive a position feedback signal, wherein the position feedback signal corresponds to an angular position of the motor;
a memory configured to store a plurality of instructions; and
a processor in communication with the memory and configured to execute the plurality of instructions to:
sample the position feedback signal and determine an estimated value of a disturbance acceleration,
dynamically modify an acceleration limit in real-time responsive to the estimated value of the disturbance acceleration,
receive the motion command for the motor from a motion controller, wherein the motion command is a position reference signal, a velocity reference signal, an acceleration reference signal, or a combination thereof,
determine a modified motion command as a function of the motion command and the modified acceleration limit, wherein the modified motion command is a shaped position reference signal, a shaped velocity reference signal, a shaped velocity feedforward signal, a shaped acceleration reference signal, a shaped acceleration feedforward signal, or a combination thereof, and
provide the modified motion command as an input to a control module, wherein the control module is configured to control the motor.

2. The system of claim 1 wherein the processor is further configured to dynamically modify the acceleration limit by:
reading an initial acceleration limit value from the memory, and
adding the estimated value of the disturbance acceleration to the initial acceleration limit value.

3. The system of claim 2 wherein:
the motion command includes the position reference signal and the velocity reference signal,
the processor is further configured to dynamically modify a velocity limit in real-time, and
the modified motion command includes the shaped position reference signal and the shaped velocity reference signal.

4. The system of claim 3 wherein the processor is further configured to:
determine a position error by determining a difference between the position reference signal and the shaped position reference signal,
determine a velocity error by determining a difference between the velocity reference signal and the shaped velocity reference signal,
determine a modified position error by subtracting a deceleration correction value from the position error, and
determine an intercept time by dividing the velocity error by the modified position error.

5. The system of claim 4 wherein the processor is further configured to dynamically modify the velocity limit by:
multiplying the modified acceleration limit with the intercept time, and
adding a resultant value from multiplying the modified acceleration limit with the intercept time to the velocity reference signal.

6. The system of claim 1 wherein the processor is further configured to:
execute a control module to regulate a current output to the motor, and
execute a state filter in parallel to executing the control module, wherein:
the state filter includes a model of the control module,
the state filter receives the motion command and the dynamically modified acceleration limit as inputs, and
the state filter determines the modified motion command as an output.

7. The system of claim 1 wherein:
the processor is further configured to dynamically modify a velocity limit,
the state filter receives the dynamically modified velocity limit as an input,
the motion command includes the position reference signal, the velocity reference signal, and the acceleration reference signal, and the modified motion command signal includes the shaped position reference signal, the shaped velocity reference signal, and the shaped acceleration reference signal.

8. A method for shaping a motion command for a motor, the method comprising the steps of receiving at a motor drive the motion command for the motor from a motion controller, wherein the motion command is a position reference signal, a velocity reference signal, an acceleration reference signal, or a combination thereof;
sampling with the motor drive a position feedback signal corresponding to an angular position of the motor;
determining in the motor drive an estimated value of a disturbance acceleration;
dynamically modifying an acceleration limit in real-time responsive to determining the estimated value of the disturbance acceleration; and
determining a modified motion command as a function of the motion command and of the modified acceleration limit, wherein the modified motion command is a shaped position reference signal, a shaped velocity reference signal, a shaped velocity feedforward signal, a shaped acceleration reference signal, a shaped acceleration feedforward signal, or a combination thereof.

9. The method of claim 8 wherein the step of dynamically modifying the acceleration limit further comprises the steps of:
reading an initial acceleration limit value from a memory of the motor drive, and adding the estimated value of the disturbance acceleration to the initial acceleration limit value.

10. The method of claim 9 wherein:
the motion command includes the position reference signal and the velocity reference signal,
the method further comprises the step of dynamically modifying a velocity limit in real-time, and
the modified motion command includes the shaped position reference signal and the shaped velocity reference signal.

11. The method of claim 10 further comprising the steps of:
determining a position error as a difference between the position reference signal and the shaped position reference signal,
determining a velocity error as a difference between the velocity reference signal and the shaped velocity reference signal,
determining a modified position error by subtracting a deceleration correction value from the position error, and
determining an intercept time by dividing the velocity error by the modified position error.

12. The method of claim 11 wherein the step of dynamically modifying the velocity limit further comprises the steps of:
multiplying the modified acceleration limit with the intercept time, and
adding a resultant value from multiplying the modified acceleration limit with the intercept time to the velocity reference signal.

13. The method of claim 8 further comprising the steps of:
executing a control module to regulate a current output to the motor, and
executing a state filter in parallel to executing the control module, wherein:
the state filter includes a model of the control module,
the state filter receives the motion command and the dynamically modified acceleration limit as inputs, and
the state filter determines the modified motion command as an output.

14. The method of claim 8 further comprising the step of dynamically modifying a velocity limit in real-time, wherein:
the motion command includes the position reference signal, the velocity reference signal, and the acceleration reference signal,
the modified motion command is further determined as a function of the modified velocity limit, and
the modified motion command signal includes the shaped position reference signal, the shaped velocity reference signal, and the shaped acceleration reference signal.

15. A system for shaping a motion command, the system comprising:
a memory configured to store a plurality of instructions; and
a processor in communication with the memory and configured to execute the plurality of instructions to:
obtain an estimated value of a disturbance acceleration, wherein the disturbance acceleration is generated responsive to the motion command, wherein the motion command is a position reference signal, a velocity reference signal, an acceleration reference signal, or a combination thereof,
dynamically modify an acceleration limit in real-time responsive to obtaining the estimated value of the disturbance acceleration,
receive the motion command from a motion controller, and
determine a modified motion command as a function of the motion command and of the modified acceleration limit, wherein the modified motion command is a shaped position reference signal, a shaped velocity reference signal, a shaped velocity feedforward signal, a shaped acceleration reference signal, a shaped acceleration feedforward signal, or a combination thereof.

16. The system of claim 15 wherein the motion controller is an industrial controller.

17. The system of claim 15 wherein the motion controller is a dedicated control module in communication with an industrial controller.

18. The system of claim 15 further comprising:
an industrial controller configured to generate a motion profile; and
a motor drive in communication with the industrial controller to receive the motion profile.

19. The system of claim 18 wherein the memory and the processor are located in the industrial controller and wherein the motion profile is the modified motion command.

20. The system of claim 18 wherein:
the motion profile is the motion command,
the motor drive receives the motion command from the industrial controller, and
the memory and the processor are located in the motor drive.

* * * * *